Dec. 23, 1958  M. P. MARZILI  2,865,021
WIRE STITCHING MACHINE
Filed June 22, 1956  6 Sheets-Sheet 1

Mario P. Marzili
INVENTOR.

BY
Attorneys

Dec. 23, 1958 M. P. MARZILI 2,865,021
WIRE STITCHING MACHINE
Filed June 22, 1956 6 Sheets-Sheet 2

Mario P. Marzili
INVENTOR.

BY
Attorneys

Dec. 23, 1958 M. P. MARZILI 2,865,021
WIRE STITCHING MACHINE
Filed June 22, 1956 6 Sheets-Sheet 3

Mario P. Marzili
INVENTOR.

BY *(signature)*
Attorneys

Dec. 23, 1958    M. P. MARZILI    2,865,021
WIRE STITCHING MACHINE
Filed June 22, 1956    6 Sheets-Sheet 4

Mario P. Marzili
INVENTOR.

BY *[signatures]*
Attorneys

Dec. 23, 1958
M. P. MARZILI
2,865,021
WIRE STITCHING MACHINE
Filed June 22, 1956
6 Sheets-Sheet 5
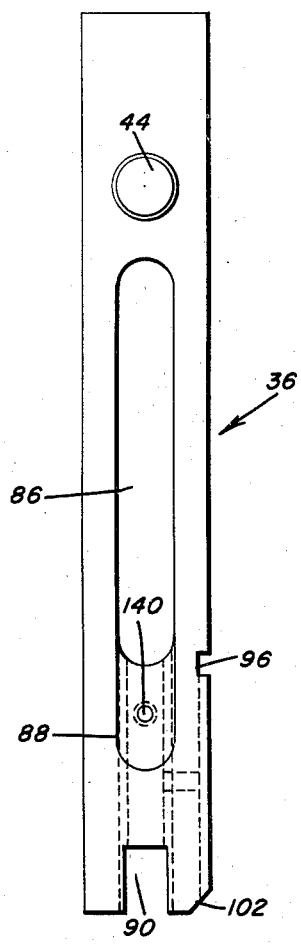
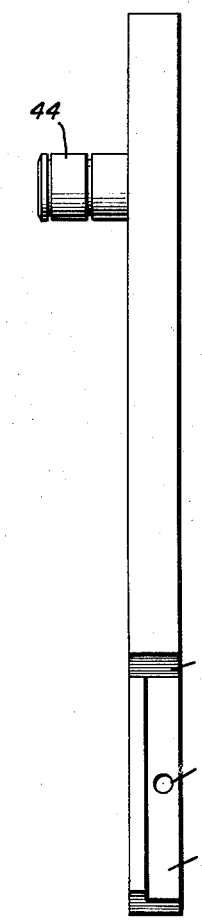
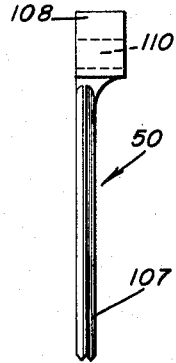
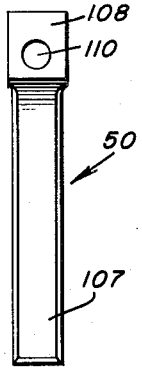
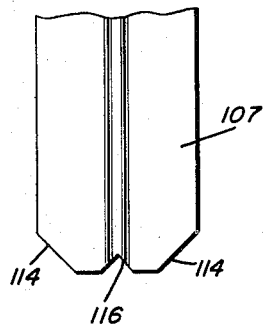
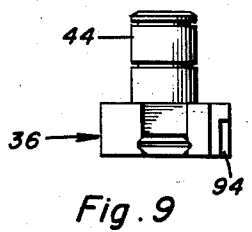
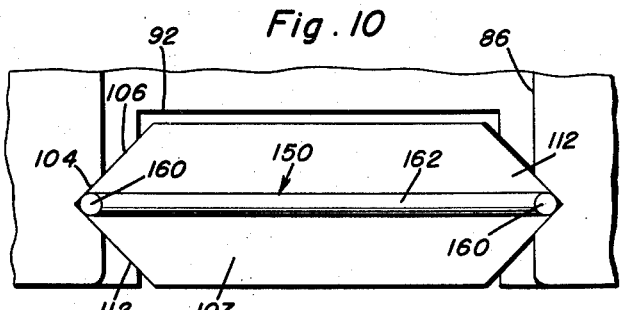
Mario P. Marzili
INVENTOR.
BY
Attorneys Dec. 23, 1958  M. P. MARZILI  2,865,021
WIRE STITCHING MACHINE
Filed June 22, 1956  6 Sheets-Sheet 6
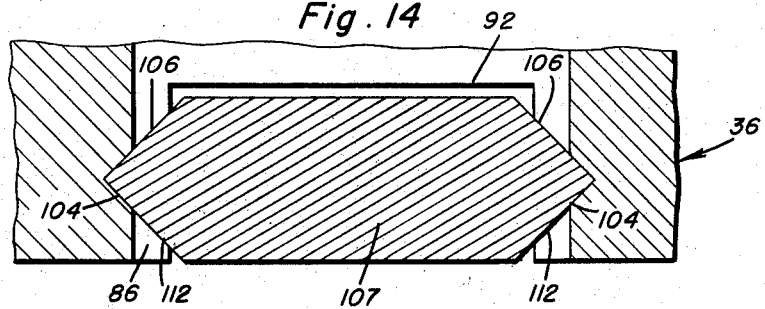
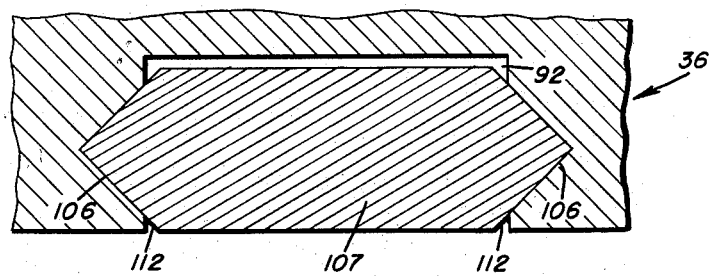
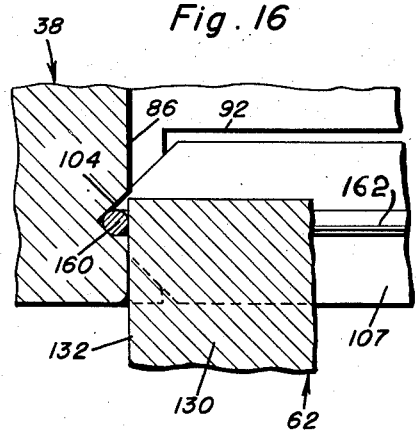
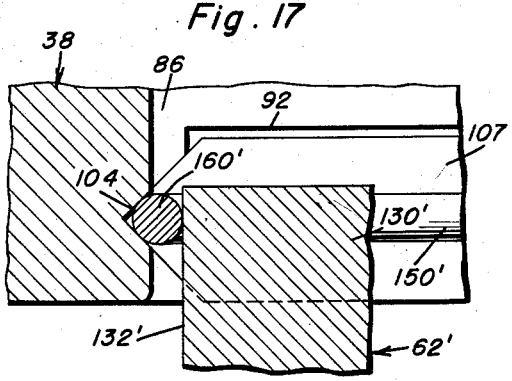
Mario P. Marzili
INVENTOR.

United States Patent Office 2,865,021
Patented Dec. 23, 1958

2,865,021

WIRE STITCHING MACHINE

Mario P. Marzili, Fort Lauderdale, Fla.

Application June 22, 1956, Serial No. 593,252

12 Claims. (Cl. 1—2)

This invention relates in general to new and useful improvements in wire stitching machines, and more specifically to improvements in wire stitching machines of the stapling type.

In a wire stapling machine a continuous length of wire is progressively fed into the machine and short lengths thereof are cut off and formed into an inverted U-shape to function as a staple. In order that the staple may be properly formed and driven by the wire stapling machine, it is necessary that the tolerances of the various parts of the machine which engage the wire staple must be relatively small or close in order that the wire staple may be properly supported. As a result, the former, the driver, the anvil and the supporter of the wire stapling machine are so proportioned with respect to each other that they will normally properly support only one gauge of wire. Thus, when it is desired to use a heavier staple, it is necessary that the former, the driver, the anvil and the supporter all be changed. Inasmuch as these various parts are so mounted in the remainder of the wire stapling machine that their removal and replacement is difficult and time consuming, it is readily apparent that it is desirable that some other means be provided to facilitate the adaptation of the wire stapling machine to various gauges of wire.

It is therefore a primary object of this invention to provide an improved wire stapling machine wherein the former is provided with V-shaped cross sectional grooves which function as wire guides, the grooves being relatively shallow so as to prevent complete seating of a wire staple therein and whereby the anvil and the supporter when disposed between adjacent portions of the former will engage the wire and form in conjunction with the boundaries of the V-shaped cross sectional grooves a confinement for the wire, the confinement being such whereby only the anvil and supporter need be replaced in order to adapt the wire stapling machine to a different gauge wire.

Still another object of this invention is to provide an improved wire stapling machine wherein the former thereof is provided with V-shaped cross sectional wire receiving grooves, there being associated with the grooves the anvil and supporter of the wire stapling machine whereby a three-point suspension for the wire is provided, the suspension being of such a nature whereby slight differences in diameter of wire is compensated for.

Still another object of this invention is to provide an improved wire stapling machine wherein the former thereof is provided with a V-shaped cross sectional recess in opposed inner surfaces thereof, the recesses forming guides for a driver disposed within the general confines of the former, the driver being provided with V-shaped cross sectional edge portions which open into the face of the driver whereby stress points in the driver is eliminated and at the same time the driver is properly supported by the former for guided movements.

Another object of this invention is to provide an improved wire stapling machine wherein the head thereof is mounted with respect to the base in such a manner whereby the entire head may be pivoted for movement back and forth relative to the base for greater accessibility and to permit the solving of many special stitching problems, particularly by providing means for locking the head in an adjusted position.

At the present time the anvils and supporters of wire stapling machines are pivotally mounted and spring urged into position. As a result, when it is desired to replace the anvil or supporter it is necessary that one undergo a tedious operation, particularly in the replacement of the anvil and support. This is primarily due to the necessity of positioning the spring and at the same time placing the pivot for the anvil or supporter back in its proper position. It is therefore a further object of this invention to provide both an improved anvil and an improved supporter, both the anvil and supporter being provided with an intermediate spring portion and an attaching ear whereby the supporter and anvil may be mounted in place by a single fastener which may be easily positioned.

A still further object of this invention is to provide an improved wire stitching machine wherein the former has the upper part thereof in the form of a piston which reciprocates in a cylinder formed in the housing part of the wire stitching machine, there being connected to the cylinder a suitable discharge passage whereby as the wire stitching machine operates compressed air is blown over the operating parts thereof to remove any foreign matter therefrom.

A further object of this invention is to provide an improved cleaning and lubricating system for wire stitching machine, the cleaning and lubricating system including a pump of which the upper part of the former of the machine functions as the piston, there being provided a suitable oil bath for the incoming air whereby the air pumped by the former is lubricated and will lubricate the various parts of the machine over which it passes.

Yet another object of this invention is to provide an improved supporter for staples of the wire stitching machine, the support including a slightly tapered staple engaging portion which is resilient whereby a supporter will properly support staples of varying wire diameters.

A still further object of this invention is to provide an improved linkage for reciprocating a former and a driver of a wire stapling machine in out of phase timed relation utilizing a single crank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is an enlarged rear view of the former and shows the specific configuration thereof, a wire shearing member normally carried thereby being omitted for purposes of clarity;

Figure 8 is an elevational view of the former on an enlarged scale and shows further details thereof;

Figure 9 is an enlarged bottom plan view of the former and shows the details of the construction at the lower end thereof;

Figure 10 is an enlarged fragmentary bottom plan view of the lower end of the former with there being positioned therein the driver and a staple having already been formed by the former on the anvil, the anvil and supporter being omitted for purposes of clarity;

Figure 11 is an enlarged rotated side elevational view of the driver and shows the specific details thereof;

Figure 12 is an enlarged rear view of the driver and shows further details thereof;

Figure 13 is an enlarged fragmentary elevational view of the lower end of the driver and shows the specific details;

Figure 14 is an enlarged fragmentary sectional view taken through the lower parts of the driver, looking up, and shows the relationship of the driver with respect to the former;

Figure 15 is an enlarged fragmentary sectional view through the driver and the former also looking up, the view being taken above the view of Figure 14;

Figure 16 is an enlarged fragmentary sectional view taken through the former in the vicinity of the supporter carried by the former, the supporter being shown in section and showing the supporter cooperating with the former to retain in place a minimum of diameter of wire used in forming the staples;

Figure 17 is an enlarged fragmentary sectional view similar to Figure 16 and shows the supporter replaced by a narrow supporter whereby the wire stapling machine is capable of accommodating a larger gauge wire;

Figure 18 is an enlarged rotated sectional view taken through a slightly modified form of the supporter and shows the specific details thereof;

Figure 19 is an enlarged rear view of the supporter of Figure 18 and shows further the details thereof;

Figure 20 is an enlarged perspective view of the anvil and shows the specific details thereof; and Figure 21 is a fragmentary sectional view similar to Figure 4 and shows the details of an air passage formed in the housing.

Figure 1:
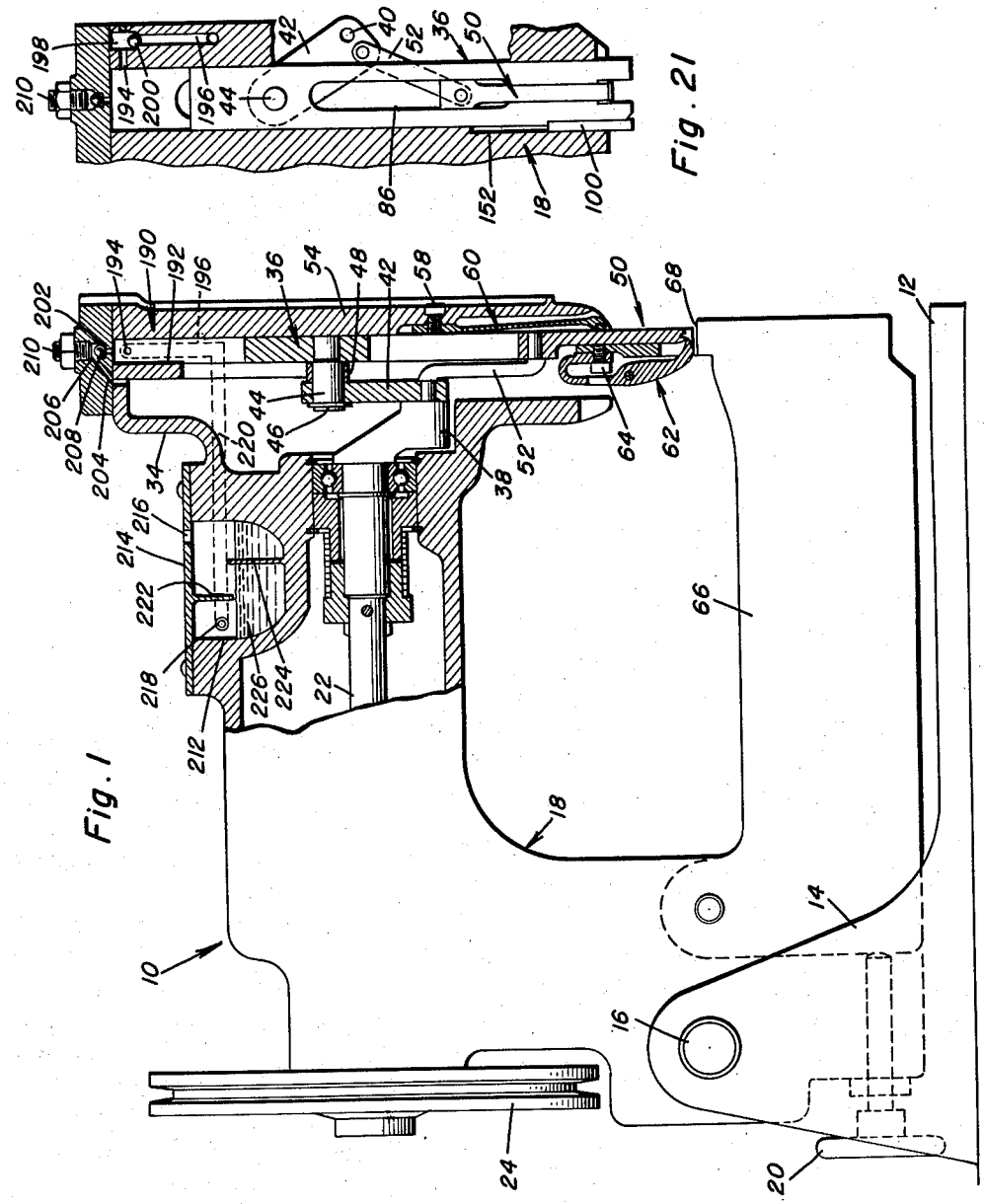
Figure 1 is a side elevational view of the upper part of the wire stitching machine which is the subject of this invention and shows the general details thereof, a portion of the housing of the stapling machine being broken away and shown in section in order to clearly illustrate the details of the operating components thereof.
Figure 2:
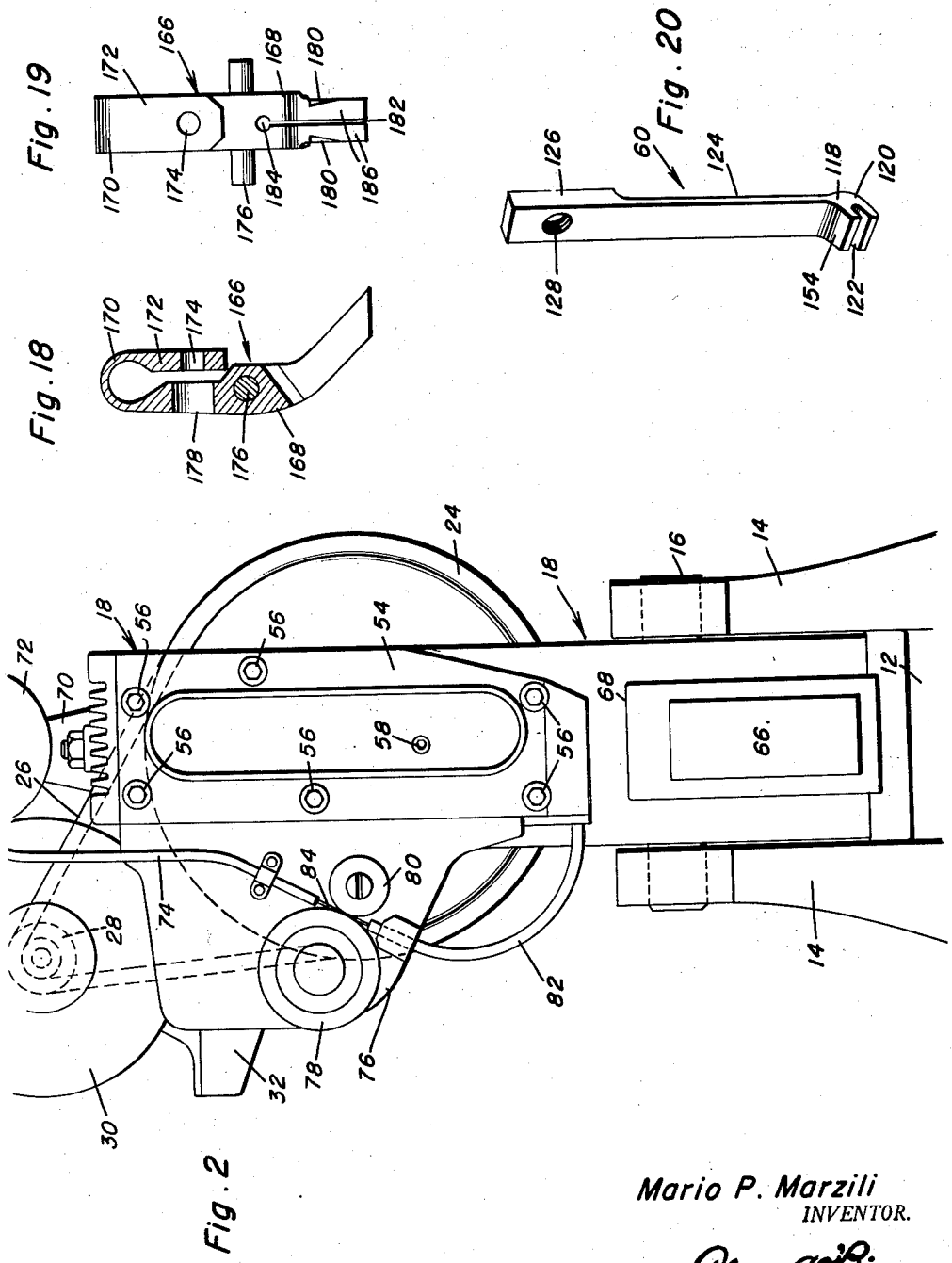
Figure 2 is a fragmentary end view of the wire stapling machine of Figure 1 and shows the general arrangement of the feed for the wire thereof.

Referring now to the drawings in detail, it will be seen that there is illustrated primarily in Figures 1 and 2, the wire stapling machine which is the subject of this invention, the wire stapling machine being referred to in general by the reference numeral 10. The wire stapling machine 10 includes a suitable base 12 which may be mounted on any desired type of support. Extending upwardly from the base 12 is a pair of ears 14 carrying a pivot pin 16. Pivotally mounted on the pivot pin 16 is a housing which is referred to in general by the reference numeral 18. Carried by the base 12 is an adjustable locking screw 20 which extends into the lower part of the housing 18 and locks the housing 18 against rotation about the pivot pin 16. It is pointed out at this time that the housing 18 is mounted for pivotal movement with respect to the base 12 so that the interior of the housing may be readily accessible when the housing 18 is disposed on its end so that the various parts thereof may be inspected, repaired or replaced.

Rotatably journalled in the housing 18 and extending the length thereof is a crankshaft 22. The crankshaft 22 has mounted on the left end thereof, as viewed in Figure 1, a drive pulley 24. The drive pulley 24 is driven by a drive belt 26 which is in turn driven from a drive pulley 28 of an electric motor 30. The electric motor 30 is suitably seated on the housing 18 by means of a mounting bracket 32.

As is best illustrated in Figure 1, the right end of the housing 18 includes a vertical portion 34 which is hollow. Suitably mounted in the vertical portion 34 for vertical guided movement is a former which is referred to in general by the reference 36. The crankshaft 22 includes a throw 38 having a pin 40 on which there is pivotally mounted a first connecting link 42. The connecting link 42 has the upper part thereof connected to the former 36 for pivotal movement, the former 36 being provided with a pin 44 which extends through the upper part of the connecting link 42 and is retained therein by means of a locking ring 46. The link 42 is spaced from the former 36 by means of a suitable spacer 48.

Slidably mounted within the former 36 and guided thereby for vertical reciprocatory movement is a driver which is referred to in general by the reference numeral 50. The driver 50 is connected to the first link 42 by means of a Z-shaped second link 52. The relationship of the links 42 and 52 and the effect thereof on the former 36 and the driver 50 will be set forth in more detail hereinafter.

The right end of the housing 18 is closed by a removable end plate 54. The end plate 54, as is best illustrated in Figure 2, is retained in place by suitable screws 56. Removably secured to the inner surface of the end plate 54 by means of a screw 58 is an anvil, which is referred to in general by the reference numeral 60. A supporter, which is referred to in general by the reference numeral 62, is retained in place on the lower part of the former 36 by means of a fastener 64.

Underlying the housing 18 and removably supported thereby is a suitable work support 66. The work support 66 includes a staple engaging face 68 which may be configurated as desired to effect the clinching of the staple to be driven.

The wire stapling machine 10 is intended to both form staples from a continuous length of wire and to drive such staples. In order to permit this, the top part of the housing 18 is provided with a suitable spool support 70 which carries a spool of wire 72. An upper tubular wire guide 74 is carried by projecting parts 76 of the housing with one end terminating adjacent the spool 72 and the opposite end terminating adjacent a feed roller 78. Cooperating with the feed roller 78 is an idler roller 80. The feed roller 78 is driven in a conventional manner in timed relation with respect to the crankshaft 22. Extending downwardly below the feed roller 78 and into a lower part of the housing 18 is a second wire guide 82. It is to be understood that the feed roller 78 will feed a predetermined length of wire, such as the wire 84 during each operation thereof.

In order to specifically set forth the purpose and operation of the various components of this invention which are believed to be new, it is deemed advisable to set forth the details of these components specifically at this time.

Referring now to Figures 7, 8 and 9 in particular, it will be seen that there is illustrated the details of the former 36. The former 36 is rectangular in cross section and is vertically elongated. Carried by the upper part of the former 36 on the rear or left side thereof is the pin 44. The intermediate part of the former 36 is provided with an elongated vertically extending recess or opening 86. The opening 86 extends entirely through the thickness of the former 36. The rear or left face of the former 36 is recessed as at 88, the recess 88 extending downwardly from the opening 86.

Formed in the lower end of the former 36 is an opening 90 which extends all the way through. Communicating the opening 90 with the opening 86 is an opening 92 in the right hand or front face of the former 36, the opening 92 being narrower than both the opening 86 and the opening 90, the opening 86 being the widest of the three.

Formed in one edge of the former 36 adjacent the lower end thereof is a vertically extending recess 94. The recess 94 terminates in a transverse positioning notch 96. Extending into the material of the former 36 from the center of the recess 94 is a threaded opening 98.

Figure 6:
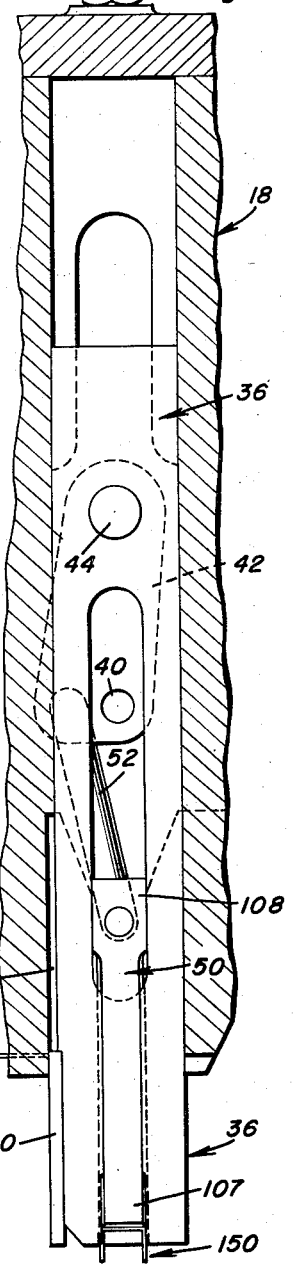
Figure 6 is an enlarged fragmentary sectional view taken substantially upon a plane indicated by section line 6—6 of Figure 5 and shows further the relationship of the former, the driver and the components operating the two.

Referring now to Figure 6 in particular, it will be seen that there is partially seated in the recess 94 and extending therefrom a shear member 100. The shear member 100 is removably retained in place by a fastener (not shown) which is threadedly engaged in the threaded opening 98. The shear member 100 has an upper positioning projection (not shown) seated in notch 96. The lower end of the shear member 100 is spaced from the lower part of the former 36 due to the beveled portion 102 at the lower end of the former 36. However, the lower ends of the shear member 100 and the former 36 are coplanar.

Opposite side faces of the openings 86 and 92 are provided with continuous shallow vertically extending V-shaped cross sectional recesses 104 and 106, respectively. The recess 106 is a continuation of the recess 104, as is best illustrated in Figure 10.

Referring now to Figures 11, 12 and 13, in particular, it will be seen that there is illustrated the details of the driver 50. The driver 50 includes a lower blade portion 107 and an upper attaching portion 108. The attaching portion 108 has a bore 110 therethrough, the bore 110 receiving the lower part of the connecting link 52.

As is best illustrated in Figure 10, the blade portion 107 includes V-shaped cross sectional edge portions 112. The edge portions 112 are of a size and shape to be guidedly received in the recesses 104 and 106. It will be readily apparent that the driver 50 is supported on the former 36 for vertical movement only due to the relationship between the V-shaped edge portions 112 and the recesses 104 and 106.

The enlarged attaching portion 108 of the driver 50 is seated in the opening 86 at all times. The length of the opening 86 is such that full relative movement of the driver 50 with respect to the former 36 is permitted.

Referring now to Figure 13 in particular, it will be seen that the lower end of the blade portion 107 is beveled as at 114. Further, it is provided with a V-shaped notch 116 for the reception of the bridge portion of a staple to be driven.

Referring now to Figure 20 in particular, it will be seen that there is illustrated the specific details of the anvil 60. The anvil 60 includes a lower anvil portion 118 which has flat edges 120 and which is provided on the rear or left face thereof with a transverse notch 122. Formed integrally with the anvil portion 118 is an elongated leaf spring supporting portion 124 which terminates in its upper end in an attaching ear 126. The attaching ear 126 has a bore 128 therethrough receiving the screw fastener 58, the bore 128 being internally threaded.

Figure 3:
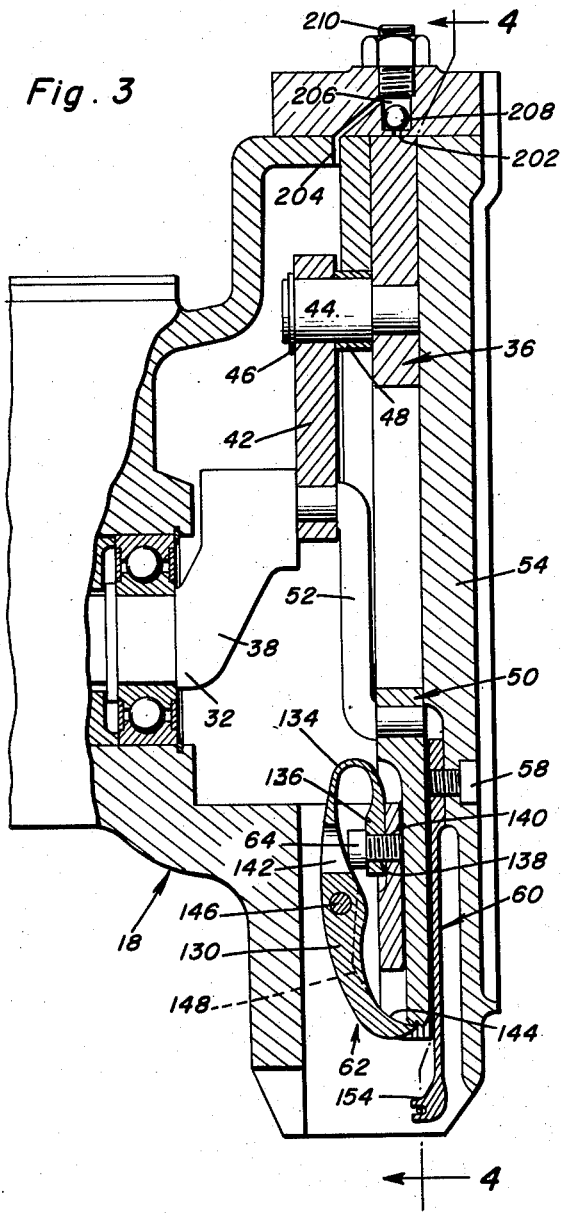
Figure 3 is an enlarged fragmentary elevational view of the stapling end of the wire stapling machine of Figure 1 with a portion of the housing broken away and shown in section in order to more clearly illustrate the relationship and details of the various operating components thereof, the wire stapling machine being illustrated in a wire receiving position.
Figure 5:
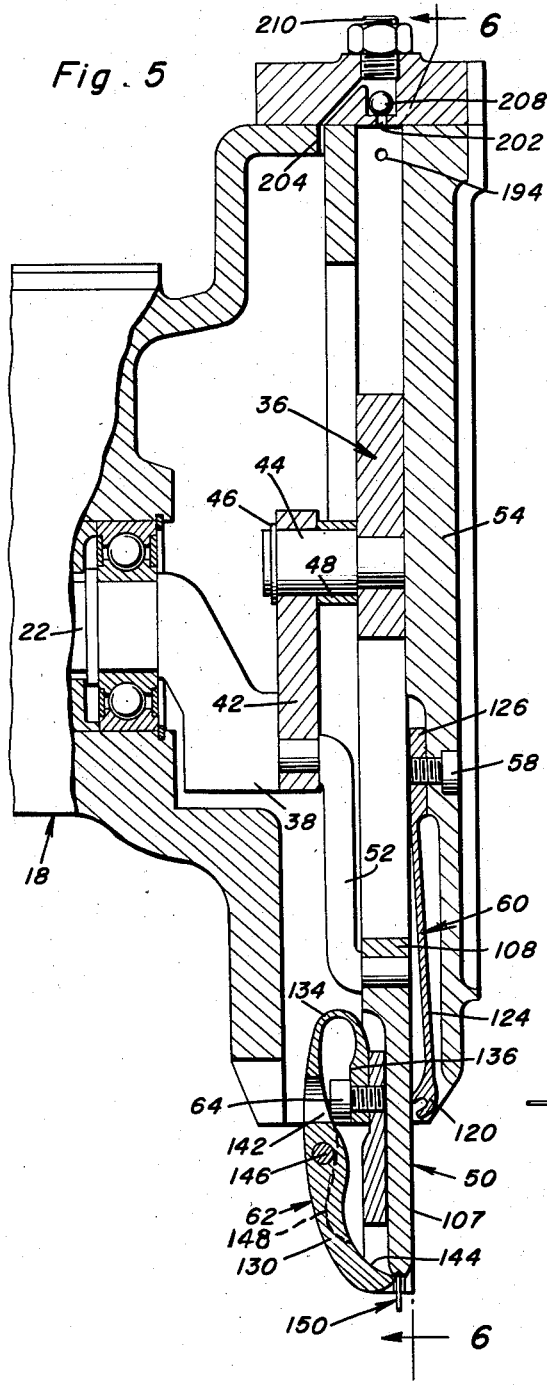
Figure 5 is an enlarged fragmentary elevational view with parts broken away and shown in section similar to Figure 3 and shows the driver and the former in a staple supporting and driving position.

Referring now to Figures 3 and 5 in particular, it will be seen that the supporter 62 includes a lower staple engaging portion 130 which has flat opposite edges 132, as is best illustrated in Figure 16. Integrally connected to the upper part of the staple engaging portion 130 is a reversely bent leaf spring portion 134 which has connected to the lower end thereof an attaching ear 136.

The attaching ear 136 is provided with an aperture 138 receiving the screw fastener 64. The screw fastener 64 is threadedly engaged in an internally threaded bore 140 formed in the former 36 in the bottom part of the opening 88, as is best illustrated in Figure 7. It is to be noted that the attaching ear 136 is seated in the opening 88. The portion of the spring 134 attached to the staple engaging portion 130 is provided with an opening 142 to facilitate access to the head of the fastener 64.

The upper surface of the lower end part of the staple engaging portion 130 is in the form of a cam 144. The cam 144 is engageable by the lower end of the driver 50 to move the supporter 62 out of the way of the driver and a staple during the final driving operation.

In order that the lower end of the supporter 62 is moved out of alignment with the anvil 60, there is carried by the upper part of the staple engaging portion 130 a transverse pin 146. The pin 146 is engaged with a cam surface 148 suitably formed in the housing 18.

It is to be understood that the relationship of the shaft 22, the throw 38 and the links 42 and 52 are such that when the former 36 has reached its uppermost position and begins its descent, the driver 50 will still be moving upwardly. However, the downward movement of the driver 50 is faster than the downward movement of the former 36 with the result that the driver 50 almost catches up with the former 36 at the lower end of its travel, the former 36 engaging the material to be stapled slightly in advance of the driver 50 and retaining the material to be stapled in place during the actual driving of a staple, such as the staple 150 illustrated in Figures 5 and 6. The former 36 will begin to retract just prior to the driver 50 reaching the lower end of its travel.

Figure 4:
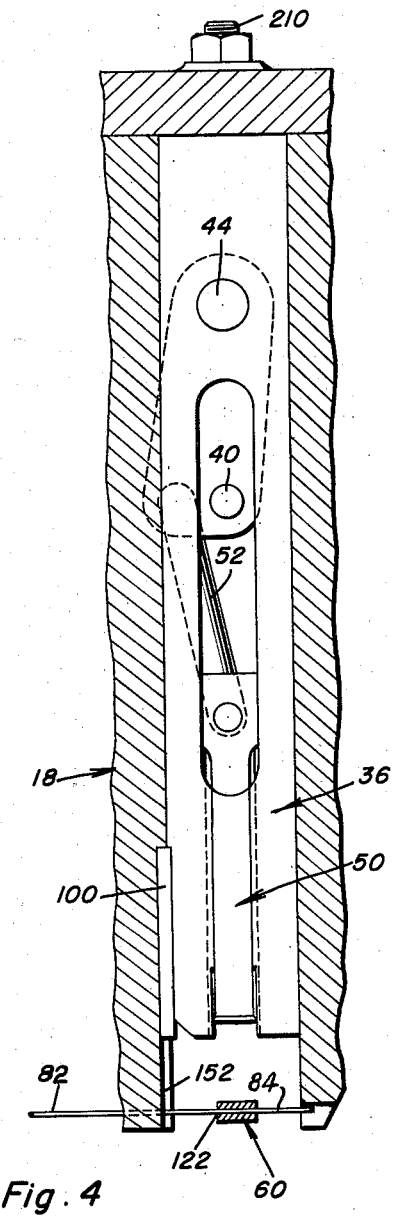
Figure 4 is a fragmentary sectional view on a large scale taken substantially upon the plane indicated by the section line 4—4 of Figure 3 and shows the relationship of the former and driver with respect to the anvil.

During the normal operation of the wire stapling machine 10, a section of the wire 84 will be fed transversely of the housing 18 in the path of the former 36, as is best illustrated in Figure 4. The wire 84 will pass through the notch 122 in the anvil 60 and will be supported by the anvil 60. As the former 36 moves downwardly the shear member 100 thereof, which is disposed in a guide 152, will cooperate with the housing 18 to shear off the proper length of wire 84. The former 36 will then continue its downward movement and will bend the wire 84 downwardly on opposite sides of the anvil 60 to form the staple 58.

Once the staple 150 has been formed, the former 36 will continue is downward movement with the staple 150 being supported by the anvil 60. The driver 50 will then move downwardly and strike a cam surface 154 on the upper part of the anvil portion 118 of the anvil 60 and move the anvil 60 to the right, as viewed in Figure 3. This will result in the releasing of the staple 150 by the anvil 60.

Prior to the releasing of the staple 150 by the anvil 60, the lower end of the supporter 62 will have passed the anvil 154 and will be disposed in alignment with the staple 150. Thus when the staple 150 is released by the anvil 60, it will then be supported by the supporter 62.

The former 36 and the supporter 62 together with the staple 150 will move downwardly in unison until such time as the former 36 and the supporter 62 reach the lower ends of their travel. The driver 50 will then continue the downward movement of the staple 150 driving it into the material which is to be stapled. The lower end of the blade 107 will strike the cam surface 144 of the supporter 62 and move the supporter 62 out of alignment with the staple 150 thus permitting the driver 50 to continue its downward staple driving movement.

Inasmuch as the staple 150 must be perfectly formed, it will be seen that the relationship between the anvil 60 and the former 36 must be one of close tolerances. Also, inasmuch as the staple 150 must be guided in its movement down through the former 36 and at the same time be supported by the supporter 62 for proper driving by the driver 50, it will be seen that the staple 150 must have a definite relationship with respect to the former 36 and the supporter 62. In the ordinary wire stapling machine this does exist. However, when it desired to change the gauge of wire for which the staple 150 is formed, it is necessary that the former, the driver, the anvil and the supporter all be replaced. While the end plate 54 is removable, the connections between the former, and driver and their respective drive means are difficult to release. Also, in the older type of wire stapling machine it was herebefore difficult to replace the anvil and the supporter due to their particular mounting due to the fact that a separate screw is used.

Referring now to Figure 16 in particular, it will be seen that the notch 104 is relatively shallow and is of a depth to not quite receive a minimum cross sectional wire. Illustrated in Figure 16 is one leg 160 of the staple 150, the staple 150 including a pair of depending legs connected by an upper bight portion 162. The width of the staple engaging portion 130 is such that the flat edges 132 thereof will clear the former 38 and at the same time will touch the leg 160. Thus, the walls of the notch 104 and the edge 132 will form a three-point or three-line support for the leg 160. A similar support is provided for the other leg 160 of the staple 150.

Referring now to Figure 17 in particular, it will be seen that there is illustrated a leg 160 of a staple which is formed of a larger guage wire. The leg 160 extends considerably out of the notch 104. In order to accommodate the leg 160', it is necessary that the supporter 62 be replaced by a supporter 62' having a narrower staple engaging portion 130'. Like the staple engaging portion 130, the staple engaging portion 130' has flat edges 132'. However, the flat edges 132' are spaced further away from the former 38 to provide the necessary clearance for the larger diametered leg 160'. It is to be noted that the leg 160' is guided by a three-line suspension defined by the boundaries of the notch 104 and by the flat edge 132'.

Although the relationship of the anvil 60 with respect to the staple 150 and the former 38 has not been specifically illustrated, it is to be understood that it would be the same as that of the supporter 62. When a larger guage of wire is utilized to make the staple with, it would be necessary not only to replace the supporter 62 but also the anvil 60. However, since the two are held in place by individual fasteners which may be easily removed, it will be readily apparent that the wire stapling machine 10 may be converted to a wire guage as desired with a minimum of effort and cut down on time. At the same time, the structure of the components of the wire stapling machine 10 is such that the staples are properly supported at all times.

Referring now to Figures 18 and 19 in particular, it will be seen that there is illustrated a modified form of supporter which is referred to in general by the reference numeral 166. The supporter 166 includes a lower staple engaging portion 168 which has integrally connected to the upper part thereof a reversely bent leaf spring portion 170. Formed integrally with the opposite end of the leaf spring portion 170 is an attaching ear 172. The attaching ear 172 is provided with a bore 174 for receiving the fastener 64. The upper portion of the staple engaging portion 168 is provided with a transverse pin 176 which functions the same as the pin 146. Extending through the staple engaging portion 168 at its intersection with the spring 170 is an opening 178 which is in alignment with the opening 174 and which is to provide access to the fastener 64.

The support 166 differs from the supporter 62 primarily in that the edges of the staple engaging portion 168 are tapered as at 180. Also, the staple engaging portion 168 is provided with a vertical slit 182 which terminates at its upper end in an enlarged opening 184. Thus the staple engaging portion 168 is actually in the form of a pair of spring legs 186. The spring legs 186 and the tapered portion 180 will resiliently engage legs of a staple, such as the staple 150. It is possible with the supporter 166 to support staples which are made of slightly off dimension wire or wire which is one gauge different from that which the supporter 166 is intended. Thus the supporter 166 will provide a much more desirable support for the staple 150 during the driving operation.

During a stapling operation with the wire stapling machine 10, fragments of wire resulting from the forming of the staples 150 as well as foreign matter from the article being stapled have a tendency to enter into the lower part of the housing 18 and to interfere with the operation of the various components of the wire stapling machine. It is therefore desirable to provide a cleansing air jet down through the vertical portion 34 over the working parts of the wire stapling machine 10.

In order to accomplish this, there is provided in the upper part of the vertical portion 34 a pump which is referred to in general by the reference numeral 190. The pump 190 includes a cylinder 192 which is integrally formed in the housing 18. The upper part of the former 36 functions as a piston. Thus when the former 36 is reciprocated, the pump 190 is actuated.

The cylinder 192 is provided with an air inlet 194 in the upper part thereof. Air enters into the inlet 194 through a vertical passage 196. Disposed at the intersection between the inlet 194 and the vertical passage 196 is a valve chamber 198 on which there is disposed a gravity actuated ball check valve 200.

The upper part of the housing 18 is provided with an air outlet 202 to which is communicated an air discharge passage 204 by means of the intermediate valve housing 206. Seated in the valve housing 206 is a gravity actuated ball check valve 208. The ball check valve 208 is adjusted in its vertical movement by means of a screw 210.

When the pump 190 is actuated, air is pumped downwardly into the vertical portion 34 of housing 18 through the air discharge passage 204. This air moves downwardly over the various parts of the crank 22, the former 36, the driver 50, the anvil 62 and the supporter 60 to clean all foreign matter therefrom.

In order that the various operating parts of the wire stapling machine 10 may be properly lubricated, there is formed in the upper part of the housing 18 an oil receptacle 212. The oil receptacle 212 is provided with a cover 214 having an inlet opening 216. The oil receptacle 212 is intended to be only partially filled and opening into the upper part thereof is an air inlet passage 218. The air inlet passage 218 is communicated with the vertical passage 196 by means of a horizontal passage 220 formed in the housing 18. Formed integral with the cover 214 and the housing 18 are suitable baffles 222 and 224, respectively. The baffles 222 and 224 are so arranged that air entering into the inlet 216 must pass through a tortuous path and through oil 226 disposed within the receptacle 212 before passing into the inlet passage 218. Thus all air entering into the pump 190 carries with it oil for lubricating purposes.

Inasmuch as the housing 18 will be rotated counterclockwise 90° from its position in Figure 1 in order to facilitate repairs and replacements of various components of the operating parts of the wire stapling machine 10, it is necessary that the receptacle 212 and the cover 214 be so designed whereby oil 226 is not accidentally emptied from the receptacle 212. It will be seen that the inlet opening 216 and the baffles 222 and 224 are so arranged whereby the oil will not run out of the receptacle 212 even though the housing 18 is stood on end.

From the foregoing description of the wire stapling machine 10, it will be readily apparent that there has been devised a desirable machine which, while operating on many of the same principles of existing machines, is so constructed whereby it may be quickly adapted to wires of different gauges with a minimum of shut down time. Secondly, various components of the machine are such that they may be readily replaced in lesser time than similar existing parts. Third, there is provided a novel drive which, while simple, provides the desired relationship between the former and the driver during their relative movement. Fourth, there is provided the desired pump assembly for supplying the combined cleansing and lubricating air to the working parts of the wire stapling machine 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple, said anvils being of a width to retain staple legs in said grooves.

2. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple, said anvil being of a width to retain staple legs in said grooves, each of said grooves being defined by intersecting walls, said anvil having flat opposite edges, one of said anvil edges and said intersecting walls of one of said grooves providing a three point guide for a circular cross sectional staple leg.

3. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple, said anvil being of a width to retain staple legs in said grooves, mounting means releasably mounting said support means whereby said anvil may be replaced by other anvils of different widths for accommodating wires of different diameters.

4. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple; said anvil being of a width to retain staple legs in said grooves, each of said grooves being defined by intersecting walls, said anvil having flat opposite edges, one of said anvil edges and said intersecting walls of one of said grooves providing a three point guide for a circular cross sectional staple leg, mounted means releasably mounting said support means whereby said anvil may be replaced by other anvils of different widths for accommodating wires of different diameters.

5. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple, said anvil being of a width to retain staple legs in said grooves, a staple supporter carried by said former, said staple supporter including a staple engaging portion positioned in said guideway in alignment with said anvil, said anvil and said staple engaging portion being of substantially the same width, mounting means releasably mounting said anvil and said staple supporter whereby said anvil and said staple supporter may be replaced by other anvils and staple supporters of different widths for accommodating wires of different diameters.

6. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guideway, said grooves being relatively shallow as compared to the remainder of said guideway, said driver having V-shaped edge portions seated in said grooves, said grooves forming wire guides for legs of a wire staple, said anvil being of a width to retain staple legs in said grooves, a staple supporter carried by said former, said staple supporter including a staple engaging portion positioned in said guideway in alignment with said anvil, said anvil and said staple engaging portion being of substantially the same width, said staple engaging portion being longitudinally split and having tapered edges to resiliently engage staple legs of slightly different cross section.

7. In a wire stitching machine of the stapling type, a reciprocating former, a guideway in said former, a driver mounted in said guideway for movement relative to said former, an anvil, support means resiliently positioning said anvil in alignment with said guideway for cooperation with said former and said driver, said former having opposed inner walls defining edges of said guideway, V-shaped cross sectional grooves in said inner walls forming extensions of edges of said guidway, said grooves being relatively shallow as compared to the remainder of said guideway, said driver having V-shaped edge portions seated in said grooves, said grooves forming wire guides for legs of a wire staple, said anvil being of a width to retain staple legs in said grooves, a staple supporter carried by said former, said staple supporter including a staple engaging portion positioned in said guideway in alignment with said anvil, said anvil and said staple engaging portion being of substantially the same width, said staple engaging portion being longitudinally split and having tapered edges to resiliently engage staple legs of slightly different cross section, said staple supporter being of a one-piece construction and including a spring supporting leg.

8. A staple supporter for a wire stapling machine, said staple supporter comprising a staple engaging portion, an attaching ear and an intermediate spring portion integrally connecting said staple engaging portion to said attaching ear.

9. A staple supporter for a wire stapling machine, said staple supporter comprising a staple engaging portion, an attaching ear and an intermediate spring portion integrally connecting said staple engaging portion to said attaching ear, said staple engaging portion being longitudinally split and having tapered edges to resiliently engage staple legs of slightly different cross section.

10. In a wire stapling machine, a housing, a cylinder formed in an upper part of said housing, a former mounted in said housing for vertical reciprocatory movement, said former having an upper piston portion, said piston portion being mounted within said cylinder and forming in conjunction therewith a pump, an exhaust passage communicating with said cylinder for supplying pressurized cleaning air to moving parts of the wire stapling machine.

11. In a wire stapling machine, a housing, a cylinder formed in an upper part of said housing, a former mounted in said housing for vertical reciprocatory movement, said former having an upper piston portion, said piston portion being mounted within said cylinder and forming in conjunction therewith a pump, an exhaust passage communicated with said cylinder for supplying pressurized cleaning air to moving parts of the wire stapling machine, an oil bath carried by said housing, an air intake passage communicating said oil bath with said cylinder whereby said air carries lubricant for the moving parts.

12. In a wire stapling machine, a housing, a cylinder formed in an upper part of said housing, a former mounted in said housing for vertical reciprocatory movement, said former having an upper piston portion, said piston portion being mounted within said cylinder and forming in conjunction therewith a pump, an exhaust passage communicated with said cylinder for supplying pressurized cleaning air to moving parts of the wire stapling machine, an oil bath carried by said housing, an air intake passage communicating said oil bath with said cylinder whereby said air carries lubricant for the moving parts, said housing being mounted for pivotal movement, said oil bath being formed in said housing, baffles preventing the wasting of oil when said housing is tilted.

References Cited in the file of this patent

UNITED STATES PATENTS

| | | |
|---|---|---|
| 472,516 | Arnold | Apr. 12, 1892 |
| 2,079,568 | Christensen | May 4, 1937 |
| 2,179,036 | Fischer | Nov. 7, 1939 |
| 2,226,598 | Wright | Dec. 31, 1940 |
| 2,635,234 | Reed | Apr. 12, 1953 |
| 2,673,344 | Sandberg | Mar. 30, 1954 |

FOREIGN PATENTS

| | | |
|---|---|---|
| 112,910 | Great Britain | Jan. 31, 1918 |